（12） United States Patent
Fair et al.

(10) Patent No.: US 7,809,883 B1
(45) Date of Patent: Oct. 5, 2010

(54) CACHED READS FOR A STORAGE SYSTEM

(75) Inventors: Robert Fair, Cary, NC (US); Grace Ho, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 435 days.

(21) Appl. No.: 11/873,298

(22) Filed: Oct. 16, 2007

(51) Int. Cl.
*G06F 12/00* (2006.01)
(52) U.S. Cl. .............. 711/113; 711/137; 711/E21.016; 711/E12.017
(58) Field of Classification Search .............. None
See application file for complete search history.

(56) References Cited

U.S. PATENT DOCUMENTS

| | | | | |
|---|---|---|---|---|
| 6,282,614 | B1 * | 8/2001 | Musoll | 711/122 |
| 2004/0022094 | A1 * | 2/2004 | Radhakrishnan et al. | 365/200 |
| 2005/0154825 | A1 * | 7/2005 | Fair | 711/113 |
| 2007/0220208 | A1 * | 9/2007 | Nomura et al. | 711/137 |

OTHER PUBLICATIONS

U.S. Appl. No. 10/753,608, filed Jan. 8, 2004, Fair.
U.S. Appl. No. 10/721,596, filed Dec. 25, 2003, Fair.
* cited by examiner

*Primary Examiner*—Reginald G Bragdon
*Assistant Examiner*—Gurte J Bansal
(74) *Attorney, Agent, or Firm*—Stattler-Suh PC

(57) ABSTRACT

Embodiments of the invention may improve read operations for fully cached workloads on storage systems with limited processing or CPU-cache resources. Some embodiments employ an indicator such as a counter to indicate when the use of readahead analysis steps, such as resource, intensive predictive processing, is undesirable. In these embodiments, the counter is incremented for each buffer cache read that is successfully performed without the need for a disk input/output operation. When the counter variable exceeds a threshold such as, for example, a maximum readahead size, then the system advantageously foregoes predictive processing steps of the readahead analysis phase, and further foregoes a readahead execution phase. The foregoing results in a net performance benefit for the system based on a reduced likelihood of a need for an input/output operation, and further, based on a reduced likelihood of a need for predictive processing relating to readahead analysis and/or execution.

20 Claims, 11 Drawing Sheets

| FILE SIZE | NUMBER OF READSETS |
|---|---|
| < 64 kB | 0 |
| 64 kB – 512 kB | 1 |
| 512 kB – 50 MB | 2 |
| 50 MB – 1 GB | 5 |
| 1 GB – 10 GB | 10 |
| > 10 GB | 15 |

FIG. 5

CACHED READS FOR A STORAGE SYSTEM

FIELD OF THE INVENTION

The present invention is related to the field of caching, and is more specifically directed to improving cached reads.

BACKGROUND

A storage system is a computer that provides storage service relating to the organization of information on storage devices, such as disks. The storage system includes a storage operating system that logically organizes the information as a set of data blocks stored on the disks. In a block-based deployment, such as a conventional storage area network (SAN), the data blocks may be directly addressed in the storage system. However, in a file-based deployment, such as a network attached storage (NAS) environment, the operating system implements a file system to logically organize the data blocks as a hierarchical structure of addressable files and directories on the disks. In this context, a directory may be implemented as a specially formatted file that stores information about other files and directories.

The storage system may be configured to operate according to a client/server model of information delivery to thereby allow many client systems (clients) to access shared resources, such as files, stored on the storage system. The storage system is typically deployed over a computer network comprising a geographically distributed collection of interconnected communication links, such as Ethernet links, that allow clients to remotely access the shared information (e.g., files) on the storage system. The clients typically communicate with the storage system by exchanging discrete frames or packets of data formatted according to predefined network communication protocols, such as the Transmission Control Protocol/Internet Protocol (TCP/IP). In this context, a protocol consists of a set of rules defining, how the interconnected computer systems interact with one another.

In a file-based deployment, clients employ a semantic level of access to files and file systems stored on the storage system. For instance, a client may request to retrieve ("read") or store ("write") information in a particular file stored on the storage system. Clients typically request the services of the file-based storage system by issuing file-system protocol messages (in the form of packets) formatted according to conventional file-based access protocols, such as the Common Internet File System (CIFS), the Network File System (NFS) and the Direct Access File System (DAFS) protocols. The client requests identify one or more files to be accessed without regard to specific locations, e.g., data blocks, in which the requested data are stored on disk. The storage system converts the received client requests from file-system semantics to corresponding ranges of data blocks on the storage disks. In the case of a client "read" request, data blocks containing the client's requested data are retrieved and the requested data is then returned to the client.

In a block-based deployment, client requests can directly address specific data blocks in the storage system. Some block-based storage systems organize their data blocks in the form of databases, while other block-based systems may store their blocks internally in a file-oriented structure. Where the data is organized as files, a client requesting information maintains its own file mappings and manages file semantics, while its requests (and corresponding responses) to the storage system address the requested information in terms of block addresses on disk. In this manner, the storage bus in the block-based storage system may be viewed as being extended to the remote client systems. This "extended bus" is typically embodied as Fibre Channel (FC) or Ethernet media adapted to operate with block-based access protocols, such as the Small Computer Systems Interface (SCSI) protocol encapsulated over FC (FCP) or encapsulated over TCP/IP/Ethernet (iSCSI).

Each storage device in the block-based system is typically assigned a unique logical unit number (LUN) by which it, can be addressed, e.g., by remote clients. Thus, an "initiator" client system may request a data transfer for a particular range of data blocks stored on a "target" LUN. Illustratively, the client request may specify a starting data block in the target storage device and a number of successive blocks in which data may be stored or retrieved in accordance with the client request. For instance, in the case of a client "read" request, the requested range of data blocks is retrieved and then returned to the requesting client.

Operationally, the storage system typically identifies a read stream based on an ordered sequence of client accesses to the same file. As used hereinafter, a file is broadly understood as any set of data in which zero or more read streams can be established. Accordingly, the file may be a traditional file or directory stored on a file-based storage system.

Upon identifying a read stream, the storage system may employ speculative readahead operations to retrieve data blocks that are likely to be requested by future client read requests. These "readahead" blocks are typically retrieved from disk and stored in memory (i.e., buffer cache) in the storage system, where each readahead data block is associated with a different file-system VBN. Conventional readahead algorithms are often configured to "prefetch" a predetermined number of data blocks that logically extend the read stream. For instance, for a read stream whose client read requests retrieve a sequence of data blocks assigned to consecutively numbered file block numbers (FBNs), the file system may invoke readahead operations to retrieve additional data blocks assigned to FBNs that further extend the sequence, even though the readahead blocks have not yet been requested by client requests in the read stream.

Conventionally, predictive processing associated with readahead operations is computationally intensive and/or expensive in terms of system resources, caching, and/or data bus usage. Moreover, the result of the predictive processing of readahead analysis and/or execution only has beneficial results when appropriate disk input and/or output (I/O) operations are generated as a result. It is therefore desirable for a storage system to only selectively employ computationally intensive tasks such as predictive processing in conjunction with readahead analysis and/or readahead execution. Further, by reducing the amount of burdensome and/or unnecessary, processing, the storage system should reduce the negative effects of this type of waste on the system's performance.

SUMMARY

A storage system receives requests for data from a client and retrieves such requested data from one or more disks. Some embodiments may forego use of portions of the readahead mechanism in particular situations (e.g., when a workload is fully cached), and then, when appropriate, these embodiments advantageously resume use of the readahead mechanism, thereby resuming optimization for disk accesses. As such, the foregoing embodiments may result in a net response performance benefit, for the storage system by reducing unnecessary use of the readahead mechanism.

Some embodiments implement the readahead mechanism by using two phases, a readahead analysis phase and a readahead execution phase. The readahead analysis phase may predict future data requests, while the readahead execution phase may retrieve data from disk for a buffer cache based upon the readahead analysis phase. Accordingly to implement the foregoing, some embodiments employ an indicator, such as a counter, to indicate when the use of readahead analysis phase steps (such as predictive processing steps requiring intensive CPU, cache, and/or memory resources), is undesirable. In these embodiments, the counter is incremented for each data request that is successfully performed by retrieving all request data from cache without the need for a disk input and/or output operation (i.e., a fully cached read). When the counter variable exceeds a predetermined threshold value, then the system advantageously foregoes predictive processing steps of the readahead analysis phase, and further thereby foregoes the readahead execution phase.

BRIEF DESCRIPTION OF THE DRAWINGS

The novel features of the invention are set forth in the appended claims. However, for purpose of explanation, several embodiments of the invention are set forth in the following figures.

FIG. 5 is a schematic block diagram of an illustrative table that may be used to determine the number of readsets that may be allocated for a file or directory based on the size of the file or directory.

DETAILED DESCRIPTION

In the following, description, numerous details and alternatives are set forth for purpose of explanation. However, one of ordinary skill in the art will realize that the invention can be practiced without the use of these specific details. In other instances, well-known structures and devices are shown in block diagram form to not obscure the description of the invention with unnecessary detail.

A. Storage System

Figure 1:
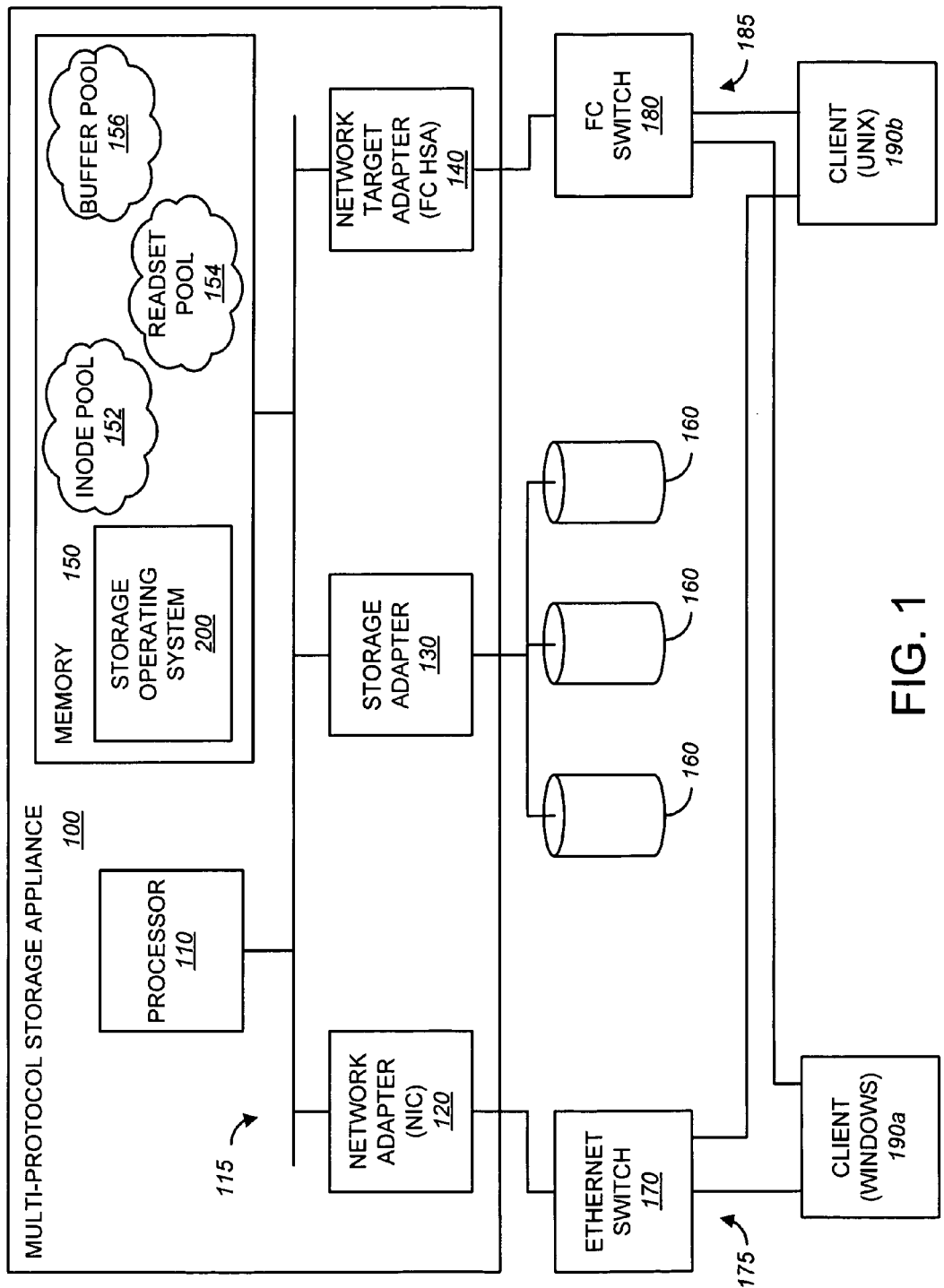
FIG. 1 is a schematic block diagram of an illustrative multiprotocol storage appliance environment that may be employed in accordance with the present invention.

FIG. 1 is a schematic block diagram of the multiprotocol storage appliance 100 configured to provide storage service relating to the organization of information on storage devices, such as storage device 160. The storage disks may be arranged in various configurations, such as a redundant array of independent disks (RAID). The storage appliance 100 is illustratively embodied as a storage system comprising a processor 110, a memory 150, a plurality of network adapters 120, 140' and a storage adapter 130 interconnected by a system bus 115.

In the illustrative embodiment, the memory 150 comprises storage locations that are addressable by the processor 110 and adapters 120-140 for storing software program code and data structures associated with the present invention. For instance, the memory may store an mode "pool" 152 containing one or more Mode data structures. Similarly, the memory may store a readset pool 154 containing readset data structures and a buffer pool 156 containing data buffers. The processor and adapters may comprise processing elements and/or logic circuitry configured to execute the software code and manipulate the data structures stored in the memory 150. A storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

To facilitate access to the storage device 160, the storage operating system 200 implements a write-anywhere file system that cooperates with virtualization modules to "virtualize" the storage space provided by storage device 160. The file, system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (LUNS).

As used herein, the term "storage operating system" generally refers to the computer-executable code operable on a computer that manages data access and may, in the case of a multiprotocol storage appliance, implement data access semantics. The storage operating system can be implemented as a microkernel, like the Data ONTAP® operating system available from Network Appliance, Inc., Sunnyvale, Calif. The storage operating system can also be implemented as an application program operating over a general-purpose operating system, such as a UNIX® or Windows® type operating system, or as a general-purpose operating system with configurable functionality, which is configured for storage applications as described herein. It is expressly contemplated that any appropriate storage operating system may be enhanced for use in accordance with the inventive principles described herein.

The storage adapter 130 cooperates with the storage operating system 200 executing on the storage appliance to access information requested by the clients 190. The information may be stored on the storage devices 160 (e.g., disks or other similar media adapted to store information). The storage adapter includes input/output (I/O) interface circuitry that couples to the disks over an I/O interconnect arrangement, such as a conventional Fibre Channel (FC) serial link topology. The information is retrieved by the storage adapter and, if necessary, processed by the processor 110 (or the adapter 130, itself) prior to being forwarded over the system bus 115 to the network adapters 120, 140, where the information is formatted into packets or messages and returned to the clients.

The network adapter 120 couples the storage appliance 100 to a plurality of clients 190a,b over, e.g., point-to-point links, wide area networks (WANs), virtual private networks (VPNs) implemented over a public network (e.g., the Internet) or shared local area networks (LANs), such as the illustrative Ethernet network 175. Therefore, the network adapter 120 may comprise a network interface card (NIC) having the mechanical, electrical and signaling circuitry needed to connect the appliance to a network switch, such as a conventional Ethernet switch 170. For this NAS-based network environment, the clients are configured to access information stored on the multiprotocol appliance as files. The clients 190 communicate with the storage appliance over the network 175 by exchanging discrete frames or packets of data according to predefined protocols, such as the Transmission Control Protocol/Internet Protocol (TCP/IP).

The clients 190 may be general-purpose computers configured to execute applications over a variety of operating systems, including the UNIX® and Microsoft Windows® type operating systems. Client systems generally utilize file-based access protocols when accessing information (in the form of files and directories) over a NAS-based network. Therefore, each client 190 may request the services of the storage appliance 100 by issuing file access protocol messages (in the form of packets) to the appliance over the network 175. For example, a client 190a running the Windows operating system may communicate with the storage appliance 100 using the Common Internet File System (CIFS) protocol over TCP/IP. On the other hand, a client 190b running the UNIX operating system may communicate with the multiprotocol appliance by using either the Network File System (NFS) protocol over TCP/IP or the Direct Access File System (DAFS) protocol over a virtual interface (VI), transport in accordance with a remote direct memory access (RDMA) protocol over TCP/IP. It will be apparent to those skilled in the art that clients running other types of operating systems may also communicate with the integrated multiprotocol storage appliance by using other file access protocols.

The storage network "target" adapter 140 couples the multiprotocol storage appliance 100 to clients 190 that may be configured to access the stored information as blocks, disks or logical units. For this SAN-based network environment, the storage appliance is coupled to an illustrative FC network 185. FC is a networking standard describing a suite of protocols and media that is primarily found in SAN deployments. The network target adapter 140 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload Fibre Channel network processing operations for the storage appliance.

The clients 190 generally utilize block-based access protocols, such as the Small Computer Systems Interface (SCSI) protocol, when accessing information, e.g., in the form of blocks or disks, over a SAN-based network. SCSI is a peripheral I/O interface with a standard, device independent protocol that allows different peripheral devices, such as storage device 160, to attach to the storage appliance 100. In SCSI terminology, clients 190 operating in a SAN environment are initiators that initiate requests and commands for data. The multiprotocol storage appliance is thus a target configured to respond to the requests issued by the initiators in accordance with a request/response protocol. When clients send SAN-based data access requests to the storage appliance, clients typically utilize logical block addresses that correspond to individual data blocks stored on the storage device 160.

B. Storage Operating System

Figure 2:
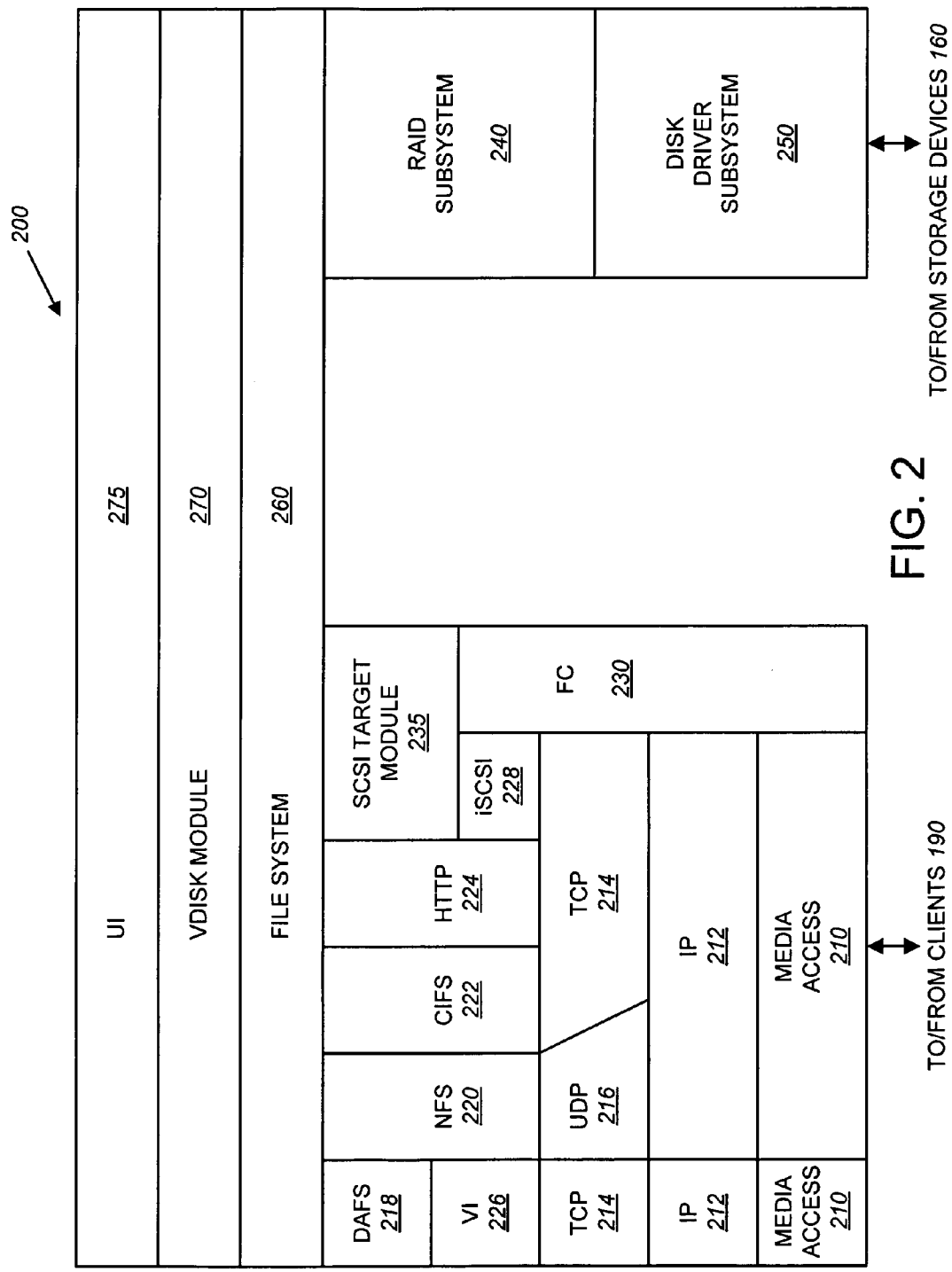
FIG. 2 is a schematic block diagram of an exemplary storage operating system that may be advantageously used with the present invention.

FIG. 2 is a schematic block diagram of an exemplary storage operating system 200 that may be advantageously used with the present invention. The storage operating system comprises a series of software layers organized to form an integrated network protocol stack or, more generally, a multiprotocol engine that provides data paths for clients to access information stored on the multiprotocol storage appliance 100 using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multiprotocol file access and, to that end, includes support for the DAFS protocol 218, the NFS protocol 220, the CIFS protocol 222 and the Hypertext. Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block-based protocol access over the TCP/IP network protocol layers, while a FC driver layer 230 operates with the FC HBA 140 to receive and transmit block access requests and responses to and from the clients 190a,b. The FC and iSCSI drivers provide FC-specific and iSCSI-specific access control to the storage device 160 and other logical units. In addition, the storage operating system 200 includes a RAID subsystem 240 that may implement a disk storage protocol, such as a RAID protocol, as well as a disk driver subsystem 250 for retrieving data blocks from the storage device 160 in accordance with a disk access protocol such as, e.g., a SCSI protocol.

Bridging the disk software layers 240 and 250 with the integrated network protocol stack layers 210-230 is a virtualization system that is implemented by a storage manager or file system 260 interacting with virtualization modules illustratively embodied as, e.g., virtual disk ("vdisk") module 270 and SCSI target module 235. The vdisk module 270 is layered on the file system 260 to enable access by administrative interfaces, such as a user interface (UI) 275, in response to a user (system administrator) issuing commands to the storage system. The SCSI target module 235 is disposed between the FC and iSCSI drivers 228, 230 and the file system 260 to provide a translation layer of the virtualization system between the block (LUN) space and the file-system space, where LUNS are represented as virtual disks. The UI 275 is disposed over the storage operating system in a manner that enables administrative or user access to various layers and subsystems, such as the RAID subsystem 240.

Figure 3:
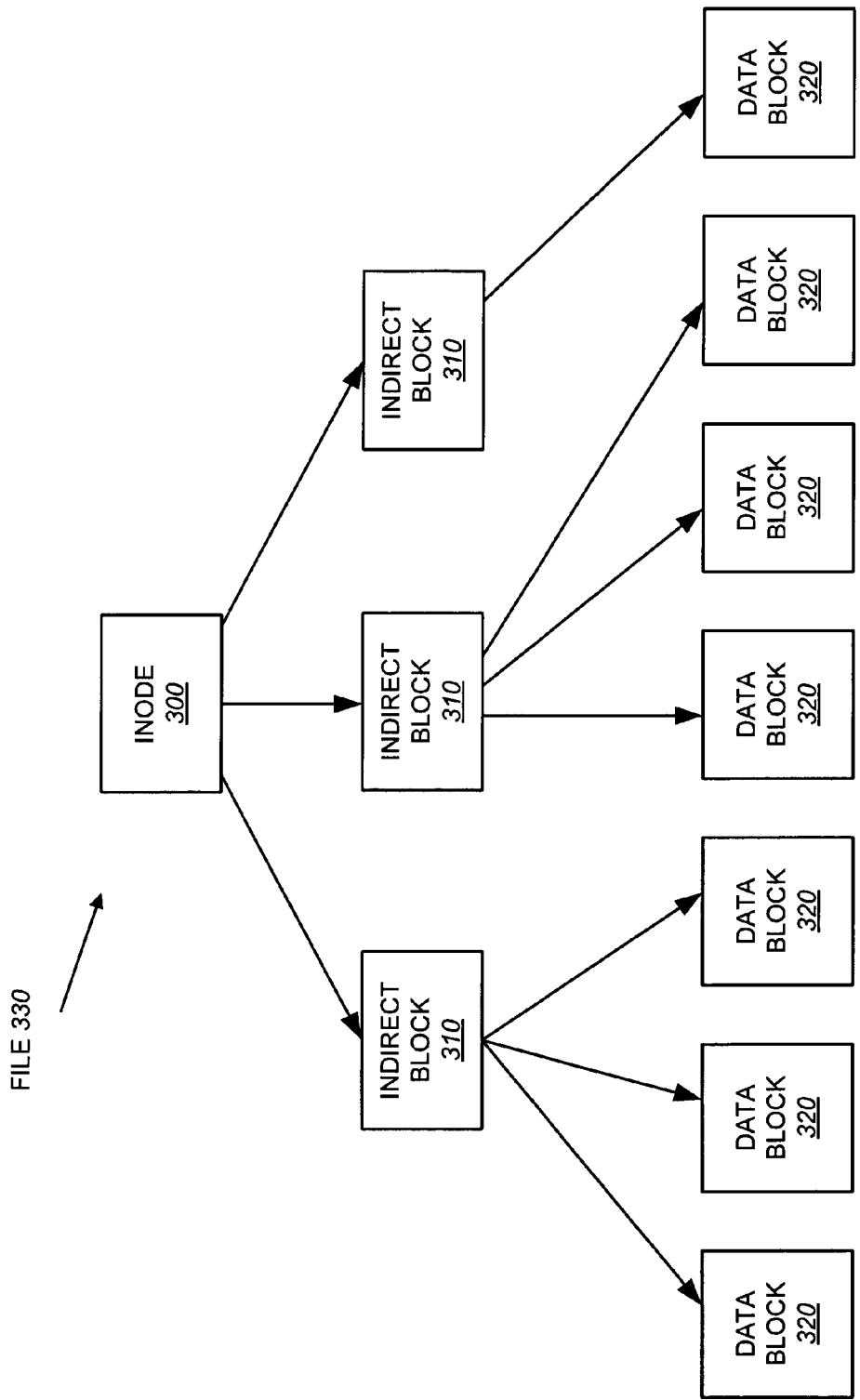
FIG. 3 is a schematic block diagram of an exemplary buffer tree that may be associated with a file or directory in the illustrative multiprotocol storage appliance.

FIG. 3 is a schematic block diagram of a buffer tree of file 330. The buffer tree is an internal representation of blocks of the file stored in memory. The buffer tree comprises a top-level inode 300 that contains metadata describing the file 330, and depending upon the size of the file, also contains pointers referencing the data blocks 320, e.g., 4 kB data blocks, that store the actual data of the file. In particular, for a large file (e.g., greater than 64 kB of data), each pointer in the inode 300 may reference an indirect (level 1) block 310 that contains up to 1024 pointers, each of which can reference a data block 320. By way of example, each pointer in the indirect blocks 310 may store a value identifying a VBN that corresponds to a data block 320 in the file system 260.

Operationally, the file system 260 receives client requests which have been processed by various software layers of the integrated network protocol stack. For example, a client request received at a network adapter 120 or 140 may be, processed by a network driver (of layer 210 or 230) which, when appropriate, forwards the request to network protocol and file access layers 212-228 for additional processing. The client request is then formatted as a file-system "message" that can be passed to the file system 260. The message may specify, among other things, a client-requested file or directory (e.g., typically represented by an inode number), a starting offset within the requested file or directory, and a length of data to write or retrieve following the starting offset.

Having identified which data blocks, e.g., FBNs 11 and 12, store the client-requested data, the file system 260 determines whether the client-requested data blocks are accessible in one or more, of the "in-core" buffers. If so, the file system retrieves the requested data from memory 150 and processes the retrieved data in accordance with the client request. However, if the requested data is not resident in the in-core memory 150, the file system 260 generates operations to load (retrieve) the requested data from the storage device 160. The file system passes a message structure identifying the VBN numbers assigned to the client-requested data blocks (i.e., FBNs 11 and 12) to the RAID subsystem 240, which maps the VBNs to corresponding disk block numbers (DBN) and sends the latter to an appropriate driver (e.g., SCSI) of the disk driver subsystem 250. The disk driver accesses the requested DBNs from the storage device 160 and loads the requested data block(s) in memory 150 for processing by the file system 260.

In addition to retrieving data blocks containing the client-requested data, the file system 260 also may instruct the disk software layers 240 and 250 to retrieve additional "readahead" data blocks from the storage device 160. These readahead data blocks may correspond to a range of data blocks (e.g., FBNs) that logically extend a read stream containing the received client request, although the readahead blocks themselves have not yet been requested. Like the client-requested data blocks, the readahead data blocks are retrieved by the disk software layers 240 and 250 and copied into appropriate memory buffers accessible to the file system 260. Such memory buffers may be obtained from the buffer pool 156. The file system may access (i.e., read or write) the client-requested data in the retrieved data blocks in accordance with the client's request, and, when appropriate, return the requested data and/or an acknowledgement message back to the requesting client 190.

C. Readsets

The operating system may employ speculative readahead operations for prefetching one or more data blocks that are likely to be requested in the read stream by future client read requests. In accordance with an illustrative embodiment, the storage operating system 200 maintains a separate set of readahead metadata for each of a plurality of concurrently managed read streams. In the illustrative embodiment, the operating system stores each read stream's metadata in a separate "readset" data structure (i.e., one read stream per readset).

Figure 4:
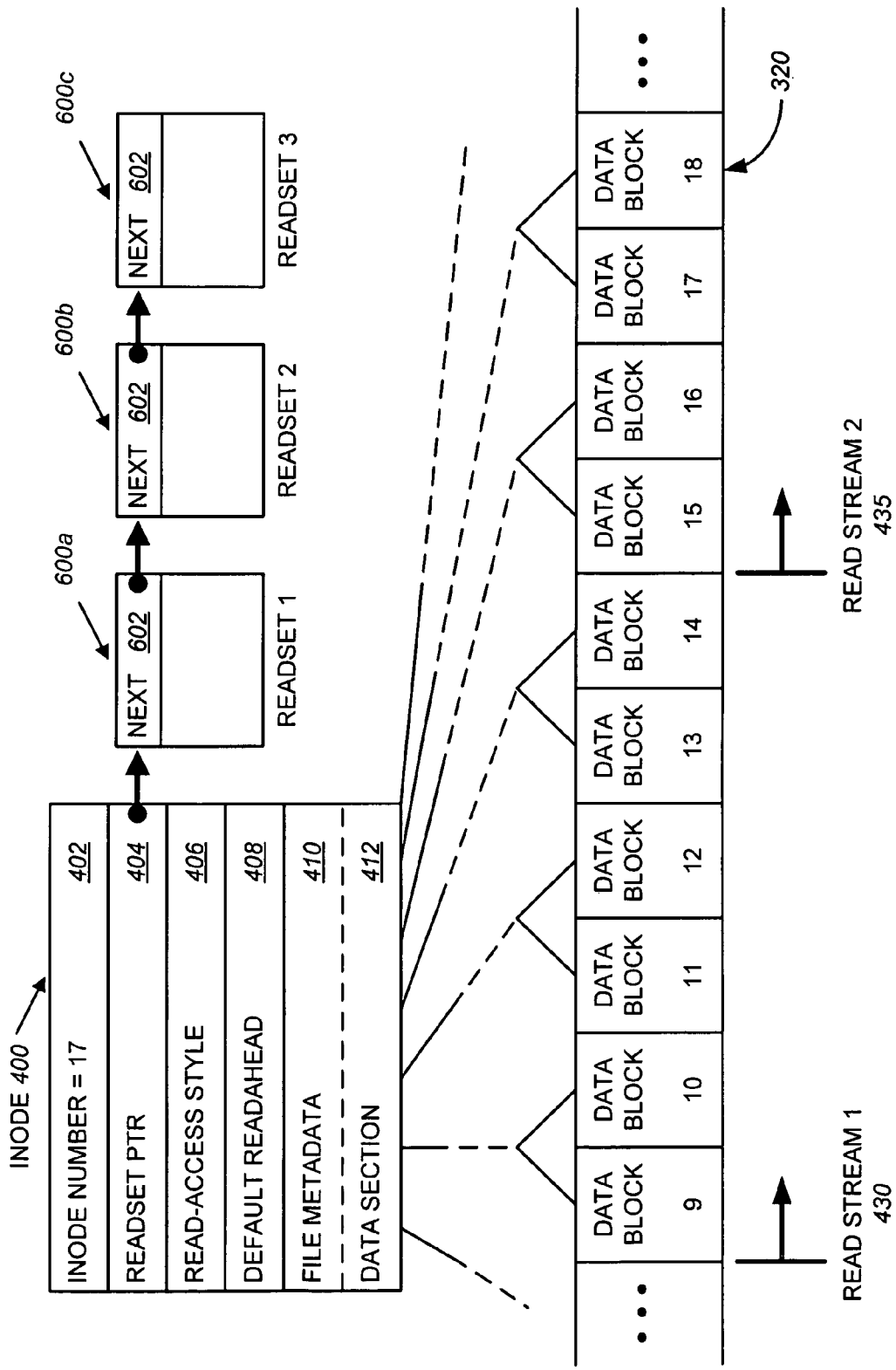
FIG. 4 is a schematic block diagram of an mode and an exemplary set of readset data structures that may be used to store readahead metadata for read streams established in the mode's associated file or directory.

FIG. 4 illustrates an exemplary inode 400 and its associated set of readsets 600a-c. The inode 400 comprises, inter alia, an inode number 402 (or other identifier), a readset pointer 404, a read-access style 406, a default readahead value 408, file metadata 410 and a data section 412. The inode 400 may be dynamically allocated or obtained from the inode pool 152 in response to the storage operating system 200 receiving a client request to access data in the inode's associated file or directory. The inode number 402 may be used to uniquely identify the file or directory associated with the inode 400. For instance, the client request may specify an inode number whose associated file or directory contains a particular range of data that the client desires to access. The client-specified inode number may be coupled with an indication of a starting offset in the file and a length of data to access beginning at the starting offset.

The read-access style 406 stores a value indicating a read-access pattern that describes the manner by which data is read from the file or directory associated with the inode 400. For instance, the read-access style may indicate that data in the inode's file or directory will be read according to e.g., a normal, sequential or random access pattern. The storage operating system 200 may dynamically identify and update the read-access pattern value 406 as it processes client read requests. Alternatively, the operating system may set the read-access value based on a "cache hint" or the like included in a received client read request. The cache hint indicates a read access pattern that the requesting client will likely employ to retrieve data from the file or directory. For example, the operating system may obtain the cache hint from a DAFS read request forwarded by a client. The DAFS protocol, including the DAFS cache hint, are described in more detail in DAFS: Direct Access File System Protocol, Version 1.00, published Sep. 1, 2001, which is hereby incorporated by reference as though, fully set forth herein.

The default readahead value 408 indicates a predetermined number of data blocks that may be prefetched (i.e., read in advance) in anticipation of future client read requests for data stored in the inode 400's associated file or directory. For instance, the default readahead value 408 may indicate that after retrieving one or more data blocks containing client-requested data, the file system should retrieve an additional amount of data blocks in anticipation of future client read requests. Those skilled in the art will recognize that the "readahead" data blocks need not be retrieved after every client read request, and instead may be acquired based on a predetermined readahead algorithm. In accordance with the illustrative embodiment, the default readahead value 408 may depend on the read-access style 406. For example, the default readahead value may equal zero for random read access patterns and may equal a relatively larger value for sequential read accesses than for normal read accesses.

The file metadata 410 stores other metadata information related to the file or directory associated with the inode 400. Such metadata information may include, inter alia, security credentials, such as user identifiers and group identifiers, access control lists, flags, pointers to other data structures, and so forth. The inode 400 also includes a data section 412 including a set of pointers that (directly or indirectly) reference the memory locations of the data blocks 320 containing the inode's associated file or directory. In this example, the pointers in the data section 412 reference one or more indirect blocks (not shown), which in turn contain pointers that reference the memory locations of a set of contiguous data blocks containing the file or directory.

FIG. 5 illustrates an exemplary table 500 that may be used to correlate file sizes stored in column 510 with corresponding numbers of allocated readsets stored in column 520. In this example, a "tiny" file (e.g., <64 kB) may not contain enough data to establish any read streams and is therefore associated with zero readsets. On the other hand, a "small" file (e.g., 64 kB-5.12 kB) may be large enough to support a single read stream and is therefore associated with a single readset. Generally, as the file size increases, the number of read streams the file can support increases and thus the number of readsets allocated to the file's inode may also increase. The file system 260 may dynamically allocate more readsets as a file's size is dynamically increased, e.g., as a result of processing one or more client "write" requests.

Figure 6:
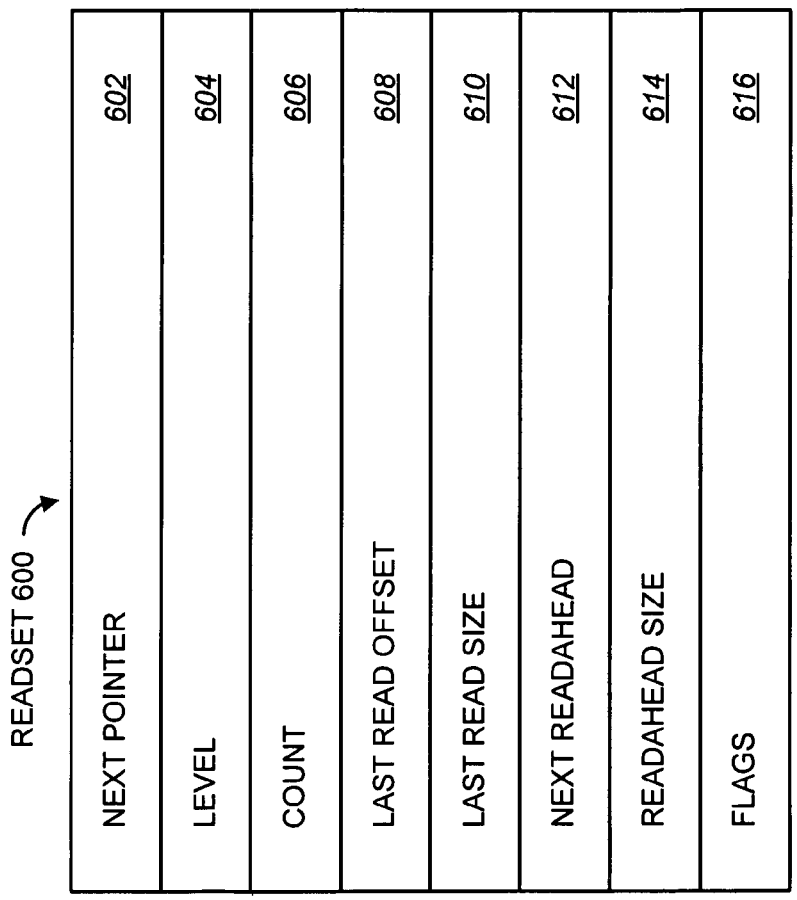
FIG. 6 is a schematic block diagram of an illustrative readset that advantageously may be employed in accordance with the present invention.

FIG. 6 illustrates an exemplary readset 600 which may be accessed via the readset pointer 404. The readset contains metadata associated with a corresponding read stream, such as the read stream 430 or 435. The readset 600 may comprise, inter alia, a next pointer 602, a level value 604, a count value 606, a last read offset value 608, a last read size 610, a next readahead value 612, a readahead size 614 and various flags 616. Those skilled in the art will understand that the readset 600 also may be configured to store other information as well, besides that explicitly shown.

The next readahead value 612 stores an indication of a predefined file offset or memory address where the file system 260 will perform its next set of readahead operations for the read stream associated with the readset 600. Specifically, when a client read request extends the read stream past the file offset or memory address indicated by the next readahead value 612, the file system may speculatively retrieve an additional set of readahead data blocks that further extend the read stream in anticipation of future client read requests. The readahead size value 614 stores the number of readahead data blocks that are prefetched. The readahead size value 614 may equal the default readahead value 408 or may be otherwise determined in accordance with a readahead algorithm. Having retrieved the readahead data blocks, the file system 260 may update the next readahead value 612 to indicate the next file offset or memory address where readahead operations will be performed for the read stream. After the readahead data blocks are retrieved, they are copied into appropriate in-core memory buffers in the memory 150 and the file system finishes processing the client read request.

Each readset 600 may include one or more flag values 616 that enable the file system 260 to specialize readahead operations for the readset's associated read stream. For instance, one of the flag values may indicate in which "direction" the file system should speculatively retrieve data blocks for the read stream. That is, the file system may be configured to retrieve data blocks in a logical "forward" direction (i.e., in order of increasing data block numbers) or in a logical "backward" direction (i.e., in order of decreasing data block numbers). Other flag values 616 may indicate whether the readahead data blocks contain "read-once" data and therefore should not be stored in the memory 150 for a prolonged period of time.

D. Matching Client Requests to Readsets

Upon receiving a client read request, the file system 260 attempts to "match" the request with a preexisting readset 600. After locating a matching readset, the operating system performs readahead operations based on the readahead metadata stored in the matching readset.

Figure 7:
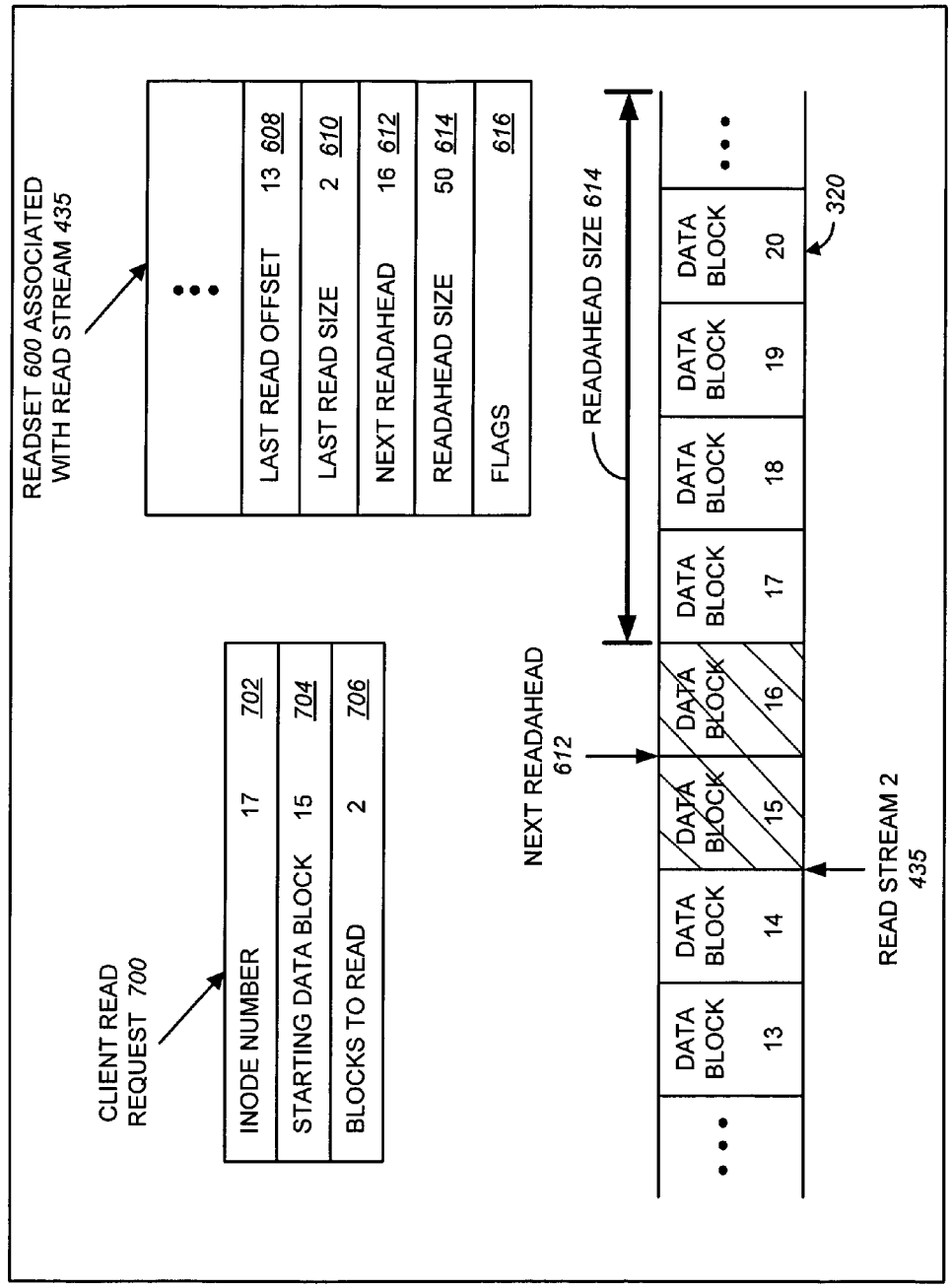
FIG. 7 is a schematic block diagram of a received client read request that may be determined to be an "exact match" with a readset associated with a preexisting read stream.

FIG. 7 illustrates an exemplary client read request 700 that logically extends the read stream 435. More specifically, the client read request is received at the multiprotocol storage appliance 100 and processed by one or more layers of the integrated network protocol stack implemented by the storage operating system 200. A file-system protocol engine, such as one of the protocol engines 218-230, formats the received client request as a file-system message which is forwarded to the file system 260. The file-system message includes various, information that enables the file system to retrieve the client's requested data. For example, the file-system message may include, among other things, an indication of an Mode number, a file offset and a length of data to retrieve. In this example, the file-system message is embodied as the client read request 700 in which the file offset and length of data to retrieve are specified in units of data blocks. Specifically, the read request 700 includes, inter alia, an Mode number 702, a starting data block 704 and a number of data blocks to read 706.

For purposes of discussion, assume the mode number equals 17, the starting data block number (e.g., FBN) equals 15 and the number of data blocks to read is 2. Accordingly, the client read request 700 instructs the file system 260 to locate the file data blocks 15 and 16 in the file or directory associated with the Mode number 17. The file system first may attempt to locate the data blocks in its in-core memory buffers to determine whether the data blocks were recently retrieved as a result of a previously processed client request. If either one or both of the data blocks 15 and 16 is not present in the memory buffers, the file system 260 cooperates with the storage subsystem 250 (e.g., RAID and disk driver layers) to retrieve the unlocated data blocks from the storage device 160. In such a case, the data blocks retrieved from disk are, copied into one or more memory buffers, e.g., acquired from the buffer pool 156.

Since the file system retrieves file block numbers 15 and 16 (shown as shaded data blocks) in response to the received file-system read request 700, the read stream 435 is extended past the beginning of the FBN number 16 designated by the next readahead value 612. Therefore, the file system 260 retrieves 50 readahead data blocks, as specified by the readahead size value 614, beginning with the next logical data block in the read stream 435 (i.e., FBN number 17). Although the number of readahead data blocks retrieved is preferably determined by the readahead size value 614, the number of readahead data blocks alternatively may be determined by other information, such as the default readahead size 406 stored in the inode number 17.

The file system 260 retrieves the readahead data blocks in the same or similar manner as it retrieved the client-requested data blocks 15 and 16. Namely, the file system first may attempt to retrieve the readahead data blocks from the in-core memory buffers (e.g., the buffer cache), and then may cooperate with the storage subsystem 250 to retrieve those readahead data blocks not present in the in-core buffers from the storage device 160. Like the client-requested data blocks retrieved from the disks, the readahead data blocks may be copied into in-core data buffers. However, because of the speculative nature of the readahead data blocks, i.e., they were not explicitly requested by a client 190, the in-core memory buffers containing the readahead data may be configured to retain, the readahead data in the memory 150 for a relatively shorter period of time, than the in-core data buffers retain the clients' explicitly requested data blocks.

It is also noted that the file system 260 may rely on other information associated with the read stream 435, such as the flag values 616, while retrieving the readahead data blocks. For instance, the value of an exemplary flag 616 may notify the file system to forego retrieval of readahead blocks, even when the read stream 435 is extended past the data block number or memory address specified by the next readahead value 612. In this situation, the value of the flag 616 may reflect that the read-access style 406 associated with the client-requested file or directory indicates that the file or directory is accessed using, e.g., a random read-access style.

In addition to retrieving the file block numbers 15 and 16 and their corresponding readahead data blocks, the file system also updates the contents of the readset 600 associated with the read stream 435. For instance, the last, read offset value 608 may be modified to correspond with the starting data block number 704. Likewise, the last read size value 610 may be updated to equal the number of data blocks 706 specified in the read request 700. Moreover, the readahead values 612-616 also may be modified, e.g., in accordance with a predefined readahead algorithm associated with the read stream 435.

E. Foregoing Unneeded Predictive. Processing of Readahead Analysis and/or Readahead Execution The readahead function and file systems such as the WAFL® type file system are further described in patent applications commonly assigned to the assignee of the present application, Network Appliance, Inc. For instance, the U.S. patent application Ser. No. 10/753,608, entitled Adaptive File Readahead Based on Multiple Factors, filed Jan. 8, 2004 by Robert L. Fair, which is incorporated herein by reference, and the U.S. patent application Ser. No. 10/721,596, entitled Adaptive File Readahead. Technique for Multiple Read Streams, filed Nov. 25, 2003 by Robert L. Fair, which is, also hereby incorporated by reference, describe implementations of a readahead mechanism. As described in the applications incorporated by reference above, the readahead mechanism, such as that provided by some file systems, is often divided into two phases.

A first (readahead analysis) phase performs analysis of a user-requested read, and calculation of which blocks should be brought into the file system's buffer cache to satisfy the user-requested read and predicted future reads. The readahead analysis phase operates and is based on past history of data reads and/or cached reads to predict future reads. The output of the readahead analysis phase is preferably a readahead-hint control block that describes the required buffers, along with information such as direction of file read, and/or read span. Some embodiments implement the readahead analysis phase by using a readahead module of a file system, which is further described below in relation to FIG. 10. The readahead analysis phase typically executes during runtime of the storage operating system.

As mentioned above, the buffer cache (such as buffer cache 1110 of FIG. 11) is often implemented by designating a portion of the main memory, (such as memory 1108 of FIG. 11) of the storage system for data requested by requestors which include, for example, clients making requests to the storage system. Hence, the buffer cache is preferably used for user type data. One of ordinary skill recognizes a variety of client requests such as for database, and/or email type applications.

A second (readahead execution) phase executes the readahead-hint control block outputted by the readahead analysis phase. The readahead execution phase checks the state of requested blocks and issues disk read commands for any blocks that are not already in the file system's buffer cache. Preferably, the disk read commands may be used for a redundant array of independent or inexpensive disks (RAID). The readahead execution phase is aware of block and buffer attributes that indicate, for example, whether a data block already exists in the file system's buffer cache, the locations of blocks on disk, and/or the allowed sizes of buffer read chains that can be sent to the disk(s). Some embodiments implement the readahead execution phase by using a disk 10 module of a file system, which is further described below in relation to FIG. 10.

Typically, when a user-read request is received, the file system first calls the readahead-analysis phase. The file system may then call the readahead-execution phase, if the readahead-analysis phase indicates that the call to the execution phase is appropriate. Then, the file system extracts data buffers (i.e., data that is buffered), from the file system's buffer cache to build a response for the requestor such as in the case of a client requesting data. Any needed data buffers that are not within the buffer cache will be awaited until present within the buffer cache. For instance, in some cases it may be necessary to start an input/output (I/O) read operation, to load needed data buffers into the buffer cache.

Some embodiments advantageously alter the behavior of readahead analysis, readahead execution, and input/output read operations of the file system. More specifically, some implementations add a counter variable to the in-memory state of the file system. The counter variable contains the number of user and/or client read operations that have been satisfied entirely from the file system's buffer cache, with no disk read operations being required between. This value is incremented by the readahead execution phase whenever execution completes successfully with no disk input and/or output operations being started. In some embodiments, the counter is incremented for each completed buffer cache read operation without the need for disk input and/or output. For instance, some embodiments increment, the counter by one for each consecutive read request satisfied by the buffer cache. The counter value is reset by both the readahead execution phase, and any file system simple input and/or output reads, whenever a disk or a RAID input/output operation is issued for user data. In some embodiments the value of the counter variable is reset to zero.

Preferably, the counter variable may be, associated with the volumes of the file system. That is, the counter variable is implemented in software as numerical value stored in memory, or in hardware as a value stored in a hardware unit. The counter variable stores a value that is an approximation to the number of consecutive buffer cache reads for each volume, without the need for disk input/output. Further, the volume-level counter variable may be implemented by using global variables (i.e., variable that may be used by all modules/functions of a program) that are stored in the memory of a software implementation.

Alternatively, the counter variable may be associated with individual file Modes. In this file-level implementation, the counter variable is also implemented by using software and/or hardware to store a value for the counters of each file or Mode. The counters of file-level implementations provide a per-file level of accuracy, which is a high level of accuracy, but requires sufficient resources to track the buffer cache reads for each file. Hence, the volume-level counter variable implementation saves in-memory storage by reducing the resources required for tracking, from the number of files to the number of volumes tracked. In the exemplary implementation described herein, the volume variable is used for illustration. The description, however, is the same for files, as for the case of volumes.

Advantageously, the value of the counter variable is checked at the start of the readahead analysis phase described above. If the value of the counter variable meets or exceeds a predetermined threshold value (T), the readahead analysis phase is preferably immediately terminated, and any predictive, processing associated with the readahead analysis, phase is also thereby preferably terminated and/or foreclosed. Further, the readahead analysis phase preferably returns an indication that no readahead execution phase is needed. The predetermined threshold value (T) may be determined using a variety of methods (as discussed further below). The calling function that requested data then loads the data buffers (described above) from the file system's buffer cache (such as the buffer cache 1110 of FIG. 11), and returns the data contained within the data buffers to the requestor, client, or user. Preferably, a traditional execution path for the buffer cache reads is used, while unneeded processing is avoided. Thus, when performing fully-cached read workloads the readahead analysis and readahead execution phases are only selectively employed, allowing for significant performance improvement.

When a cache miss within the buffer cache occurs such as, for example, when the workload is no longer fully cached within the buffer cache, the first cache miss will cause a conventional file system input/output read operation. As mentioned above, the cache miss and/or the input/output read operation resets the counter value, which lowers the counter value below the threshold value (T). Hence, upon the next read request, readahead processing will resume as before, including the predictive processing of the readahead analysis phase and/or the readahead execution phase.

The value of the threshold T may be computed based on the expected number of buffer cache reads per file or per volume. As mentioned above, per file tracking typically provides for better accuracy. For instance, some files in a particular volume may be fully cached reads, whereas other files and/or read operations in the same volume may be partially cached reads. For volume-level thresholds a heuristic value based on empirical measurement may be used. By setting the threshold appropriately high, the method of foregoing unneeded processing for fully cached workloads, advantageously, is rarely or never used for partially cached workloads. As understood by one of ordinary skill, a fully cached workload is a workload that has data that may be retrieved entirely from cache, while the data for a partially cached workload may not be retrieved entirely from cache. Particular implementations set the threshold T at a value greater than a maximum readahead size. For instance, when the counter variable is associated with volumes, the minimum value for the threshold T may be calculated as:

$$T > \frac{(\text{max\_\#\_concurrent\_streams})(\text{max\_readahead\_blocksize})}{\text{amount\_of\_overlap}}$$

As indicated, the max_#_concurrent streams is the maximum number of readstreams that the file system may process and/or store at a particular time. The max_readahead_blocksize is, for a block-based file system, the maximum number of blocks that may be readahead (i.e., from the disk to the memory, or buffer cache) per readstream for one readahead execution. The maximum readahead blocksize is computed, in one embodiment, by multiplying a readahead chunksize in blocks per chunk and the maximum number of chunks that may be read at one time. The amount of overlap is to allow for cases where one read stream may be reading data that was recently read for another read stream (which can happen sometimes). Hence, the amount of overlap allows for cases where data that is readahead for one read stream is likely to be found already in the buffer cache for the readahead operation of another read stream, and thereby undesirably give a false positive when counting fully-cached reads. The threshold and maximum readahead size are further understood in relation to specific examples. For instance, exemplary values for an embodiment are inserted below for purposes of illustration.

$$T > \frac{(\text{readahead\_chunksize} = 32\_\text{blocks})(\#\_\text{of\_chunks} = 10)}{\text{amount\_of\_overlap} = 2} \quad (\text{max\_concurrent\_streams} = 15)$$

Hence, when the maximum number of concurrent streams is fifteen, the maximum readahead blocksize is 320, and the overlap is two, then the threshold is preferably greater than a maximum readahead size of 2400 blocks. The readahead blocksize may be determined by multiplying the number of blocks in a readahead chunk by the number of chunks. Alternatively, some embodiments use an empirically determined threshold value. For instance, the per volume threshold value of a particular implementation is greater than or equal to 5000.

Figure 8:
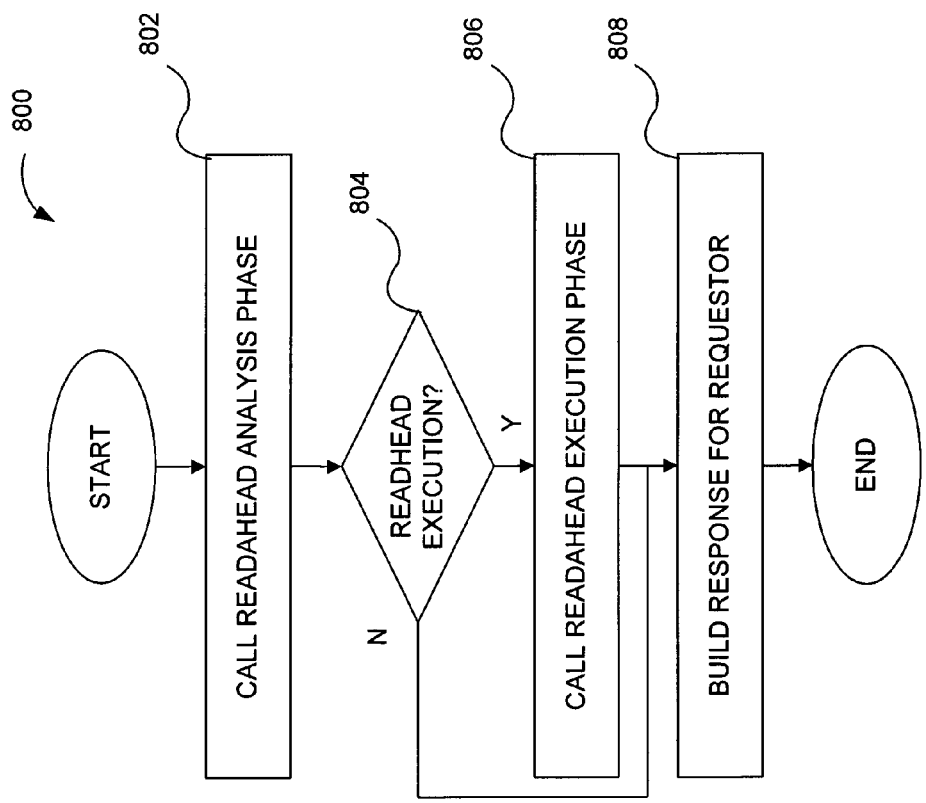
FIG. 8 is a flowchart illustrating a sequence of steps that may be performed for determining whether a readahead execution phase is desirable.
Figure 9:
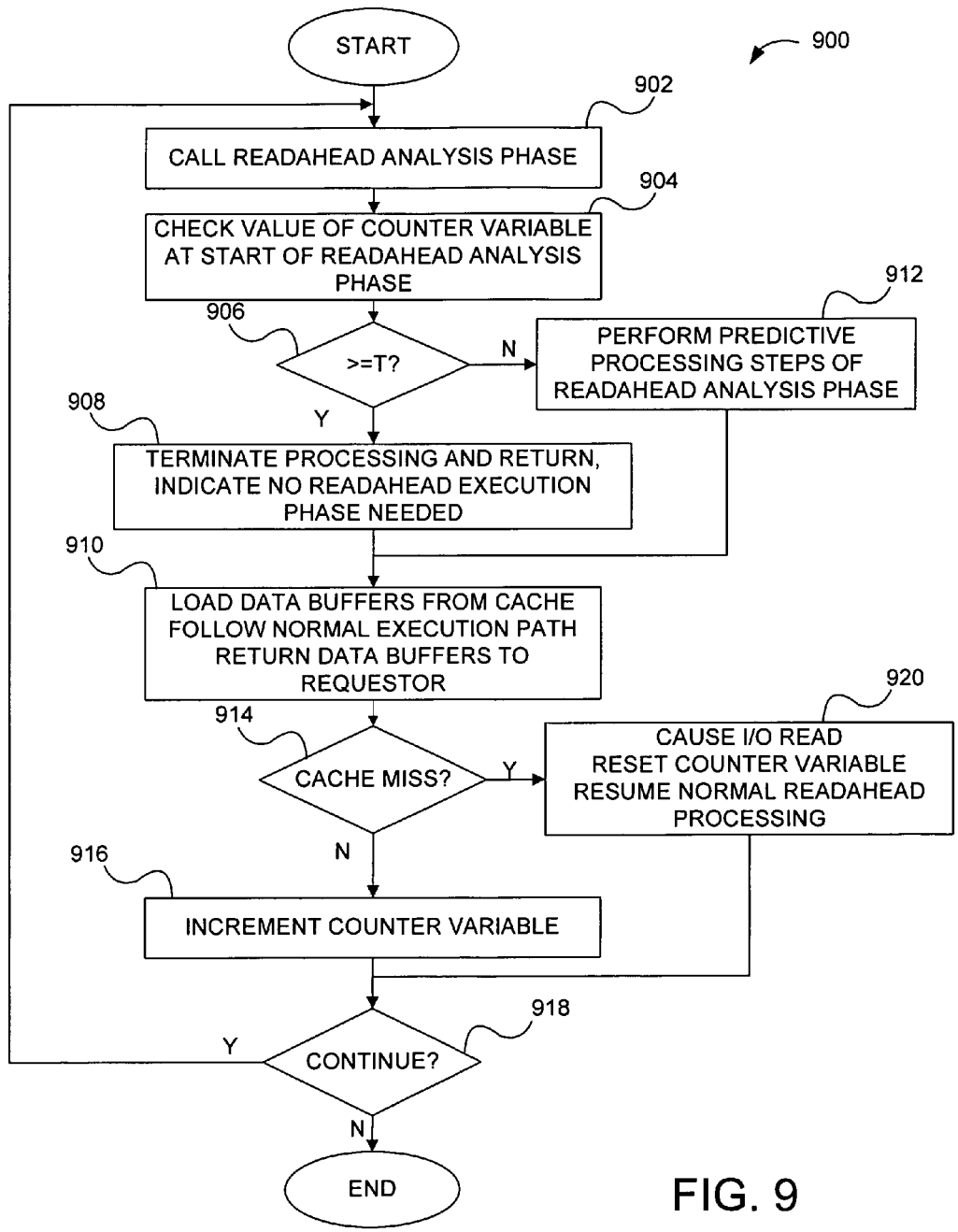
FIG. 9 is a flowchart illustrating a sequence of steps for determining whether predictive processing of a readahead analysis phase is desirable.

FIGS. 8 and 9 illustratively summarize the foregoing in the form of process flows. For instance, FIG. 8 is a flowchart illustrating a process 800 that may be performed for determining whether a readahead execution phase is desirable. As shown in this figure, the process 800 begins at the step 802, where a readahead analysis phase is called. Then, the process 800 transitions to the step 804, where a determination is made whether to perform readahead execution. In some embodiments, readahead execution is performed based on the output of the readahead analysis phase. As discussed above, the output of the readahead analysis phase is preferably a readahead-hint control block that describes the required data buffers. For instance, when the requested and/or readahead data are already present in the buffer cache of the memory, then no disk IO operations are needed. In contrast, the readahead analysis phase may determine that certain data are needed for readahead based on the processing performed by the readahead analysis phase, and the needed data are not within the buffer cache. Hence, readahead execution may be needed to load the needed (readahead) data from disk into the buffer cache of the memory.

If readahead execution should be performed, then the process 800 transitions to the step 806, where a readahead execution phase is called. After the readahead execution phase is called, then the process 800 transitions to the step 808, where a response is constructed for the requestor. The requestor typically includes a client, an application, a user, and/or an operating system function call for requesting stored data. To construct the response, the file system preferably extracts buffers containing the requested data from the buffer cache of the file system. If the needed data buffers are not present within the buffer cache, then the process 800 waits for the data buffers to be loaded into the buffer cache. If needed, an input and/or output read operation is started to load the needed data buffers into the buffer cache.

If, at the step 804, readahead execution should not be performed, then the process 800 transitions from the step 804 to the step 808 to construct the response for the requestor, without calling and/or performing the readahead execution phase. After the step 808, the process 800 concludes.

FIG. 9 is a flowchart illustrating a process 900 for determining whether predictive processing of a readahead analysis phase is desirable. As shown in this figure, the process begins at the step 902, where a readahead analysis phase is called. Then, the process 900 transitions to the step 904, where an indicator is checked. Preferably, the indicator is checked at the beginning of the readahead analysis phase. The indicator of some embodiments is a counter variable that tracks the number of consecutive cache reads without the need for performing a disk input/output operation. In these embodiments, the value of the counter variable is compared, at the step 906, to a threshold. If the value of the counter variable is greater than or equal to the threshold, then the process 900 transitions to the step 908, where further readahead processing is preferably immediately terminated. Some embodiments further return a signal that no readahead execution phase is needed. Once readahead processing is terminated at the step 908, the process 900 transitions to the step 910 where the needed buffers are loaded from the buffer cache. Preferably, a traditional execution path is followed for the loading and/or retrieval of the buffers, and the buffers are returned to the requestor or client.

If at the step 906, the value of the counter variable is less than the threshold, then the process 900 transitions to the step 912, where the steps of the readahead analysis phase are performed, including the predictive processing of the readahead analysis phase. Then, the process 900 transitions to the step 910, where the buffers are loaded from the buffer cache and the response is constructed for the requestor or client, as described above.

At the step 914, the process 900 determines whether there is a cache miss in the buffer cache. If there is not a cache miss, then the process 900 increments the counter variable at the step 916. After the step 916, the process 900 transitions to the step 918. If, at the step 914, there is a cache miss, then the process 900 transitions to the step 920. At the step 920, the process 900 causes a file system input-output read operation, resets the counter value preferably to zero, and resumes normal readahead processing. After the step, 920, the process transitions to the step 918, where a determination is made whether to continue such as, for example, the operating system and/or a system administrator may request that the program be terminated. If the process 900 should continue, then the process 900 returns to the step 904. Otherwise, the process 900 concludes.

Figure 10:
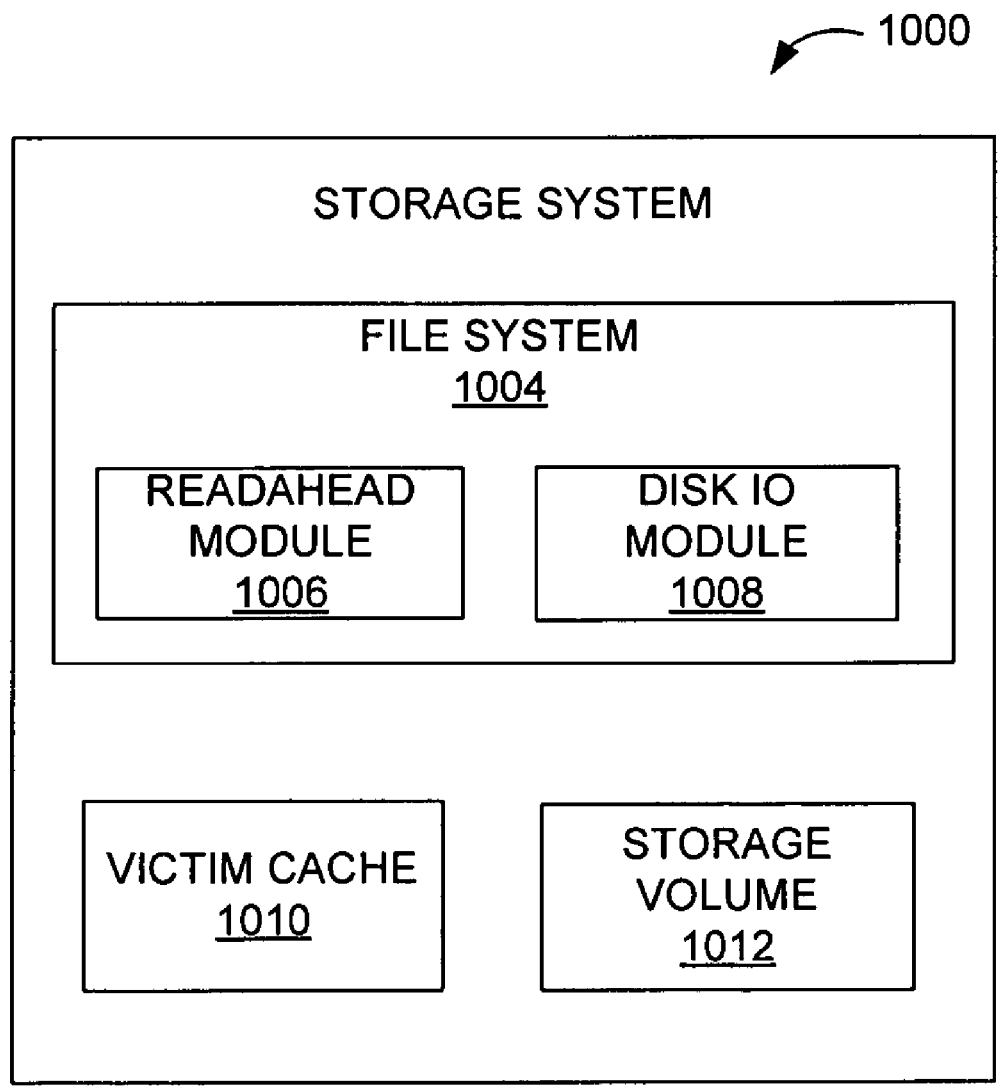
FIG. 10 illustrates the modules of a storage system according to some embodiments.

Some embodiments of the invention are deployed within or in conjunction with the software subsystem of Data ONTAP®, as provided by Network Appliance Inc., of Sunnyvale, Calif. For instance, FIG. 10 illustrates the modules of a storage system 1000 according to some embodiments. The storage system 1000 may be implemented by using the multi-protocol storage appliance 100 of FIG. 1. As shown in FIG. 10, the storage system 1000 includes a file system 1004, a readahead module 1006, a disk 10 module 1008, a victim cache 1010, and a set of one or more persistent storage volumes 1012 and/or controllers. The victim cache 1010 may be used to temporarily store user data that is recently displaced from the buffer cache for faster retrieval than if entirely relying upon disk input/output read operations. Advantageously, the victim cache 1010 provides a temporary storage that may be faster than the speed of persistent disk storage, but is not usually as fast as main memory. The victim cache 1010 may comprise a Level-3 type cache and may include, in some embodiments, a PCI memory card. The storage volume(s) 1012 preferably comprise a RAID configuration.

In particular, some embodiments implement the readahead analysis phase described above at least in part by using the readahead module 1006. For example, in some embodiments, some steps of the process 900 of FIG. 9 may be performed by the readahead module 1006 for determining whether predictive processing of a readahead analysis phase is desirable. Further, some embodiments implement the readahead execution phase described above by using the disk IO module 1008. Further, embodiments of the invention may distribute some of the steps of the resource-intensive predictive processing described above, by using both the readahead module 1006 and the disk IO module 1008.

Figure 11:
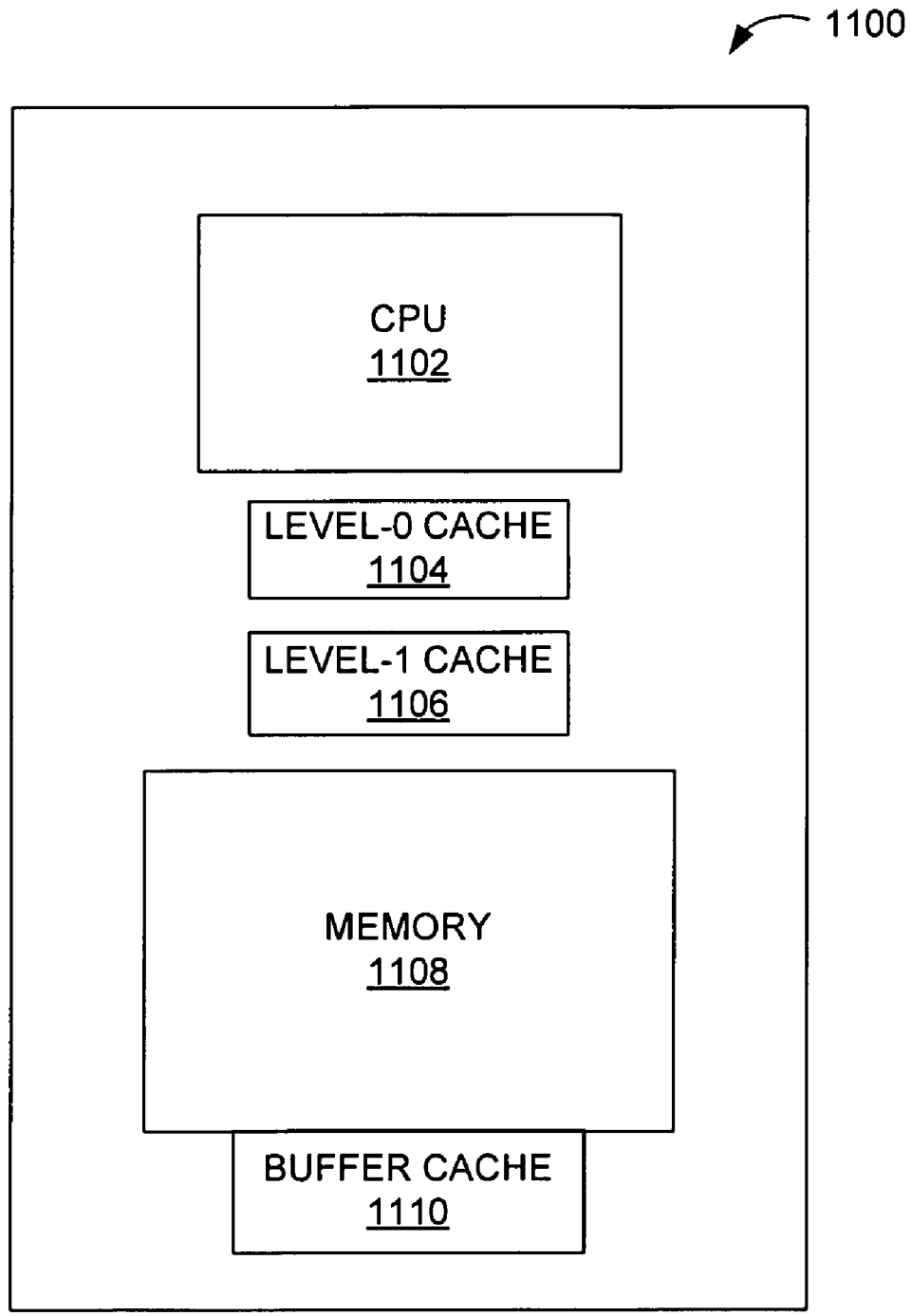
FIG. 11 illustrates a computer for operating the storage system of some embodiments.

In some embodiments, the modules of FIG. 10 may be implemented by using a general purpose computer such as the computer system 1100 illustrated in FIG. 11. As shown in this figure, the computer 1100 includes a central processor unit (CPU) 1102, one or more levels of cache such as a Level-0 cache 1104 and a Level-1 cache 1106, and a main memory 1108. As further shown in FIG. 11, the buffer cache 1110 of some embodiments, is implemented by using the main memory 1108 of the computer system 1100. Alternatively, the buffer cache 1110 of some implementations uses a separate memory from the main memory 1108.

It should be noted that the Level-3 or victim cache 1010 of FIG. 10 is separate from the buffer cache described above. Each of these types of "cache" is also separate from the Level-0 and/or Level-1 CPU-cache of FIG. 11. As mentioned above, the buffer cache is preferably implemented in main memory, such as the memory 1108 depicted in FIG. 11. Moreover, the buffer cache of main memory is preferably used for client and/or user requested type data, while the CPU-cache (Level-0/Level-1) is involved with the states and data required for the operation of the storage system, including the resource-intensive predictive processing available for selective use by the storage system.

The computer 1100 may further include one or more disk interfaces and/or controllers, including RAID controllers, for example, which are not shown. The CPU 1102 executes the steps required for operation of the storage system by using the levels of cache 1104 and 1106 and/or the main memory 1108, as needed. More specifically, the CPU 1102 may execute steps involved in predictive processing for a readahead analysis phase. One of ordinary skill recognizes, however, that such predictive processing may be computationally intensive and place a large burden on the resources of the CPU 1102, the levels of cache 1104 and 1106, and/or the memory 1108. As mentioned above, such a burden is particularly expensive when the predictive processing is unnecessary and/or undesirable.

However, to address this problem, embodiments of the invention advantageously forego undesirable predictive processing to significantly improve performance, particularly where the workload involves fully cached reads. The need is greatest for storage systems operating on small computer systems having limited CPU-cache. Further, the embodiments described above still allow conventional readahead operations and processing to operate for workloads that may benefit from such readahead operations. In alternative embodiments, different means for determining the prospective value of performing readahead analysis and/or readahead execution are performed in addition to the counter means disclosed above.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims. For instance, the indicator for selectively invoking or foregoing speculative or predictive processing steps may be implemented by using a counter having several bits in conjunction with a separate flag for indicating the result of the threshold comparison. Alternatively, the bits of the counter itself may serve as the indicator or flag.

Further, although the illustrative embodiments depict read streams that extend in a "forward" direction, or in order of increasing data block numbers, those skilled in the art will appreciate that the inventive concepts set forth herein are equally applicable for read streams that extend in a "backward" direction, or in order of decreasing data block numbers. Accordingly, the file system retrieves readahead data blocks for a read stream in the direction in which the read stream extends.

As described above, the counter of some embodiments is preferably implemented as a global variable for the volumes of the file system. More specifically, the counter variable may be implemented in conjunction with the readahead analysis module 1006 of FIG. 10.

The embodiments were chosen and described in order to explain the principles of the invention and its practical applications, to thereby enable others skilled in the art to utilize the invention and various embodiments with various, modifications as are suited to the particular use contemplated. Moreover, non-dependent acts may be performed in parallel.

Furthermore, the use of the phrase "one" or "an" embodiment throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or systems.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems' registers and memories into other data similarly, represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

While this description has been written in reference to a multiprotocol storage appliance, the principles are equally pertinent, to all types of computers, including those configured for block-based storage systems such as storage area networks, file-based storage systems such as network attached storage systems, combinations of both types of storage systems such as multiprotocol storage appliances, and other forms of computer systems. It is also expressly contemplated that the teachings of this invention can be implemented as software, including a computer-readable medium having program instructions executing on a computer, hardware, firmware, or a combination thereof. Moreover, those skilled in the art will also understand that the teachings set forth herein are not limited to any specific operating system (OS) implementation, and instead may be executed by a wide variety of OS platforms. Accordingly this description is meant to be taken only by way of example and not to otherwise limit the scope of the invention.

What is claimed is:

1. A method of caching data for use by a storage appliance comprising one or more storage devices, the method comprising:

providing the storage appliance configured for:

providing a file system for organizing data in a plurality of files, each file having at least one established read stream comprising a sequence of data accesses to the file;

receiving a read request for requested data of a file;

maintaining a counter that indicates a number of consecutive read requests satisfied by the storage appliance by retrieving data from a buffer cache without retrieving data from the one or more storage devices;

determining the value of the counter;

responsive to determining that the value of the counter does not exceed a threshold value, performing predictive processing for selecting readahead data from the one or more storage devices, the readahead data not comprising the requested data and comprising predicted data for loading into the buffer cache; and responsive to determining that the value of the counter exceeds the threshold value, foregoing the predictive processing, wherein the threshold value is based on a maximum number of concurrent read streams processed by the file system at the same time, a maximum readahead blocksize comprising a maximum number of readahead data blocks loaded to the buffer cache per read stream for one predictive processing execution, and an amount of overlap indicating a number of same readahead data blocks in the buffer cache.

2. The method of claim 1, further comprising:

responsive to determining that the value of the counter exceeds the predetermined threshold value, further foregoing a readahead execution phase for loading the readahead data into the buffer cache.

3. The method of claim 1, further comprising:

building a response to the read request by extracting data from the buffer cache; and for requested data not found in the buffer cache, loading the requested data into the buffer cache.

4. The method of claim 1, wherein the counter indicates a number of consecutive read requests for a volume of the file system satisfied by the storage appliance by retrieving data from a buffer cache without retrieving data from the one or more storage devices.

5. The method of claim 1, wherein predictive processing comprises selecting readahead data comprising data blocks predicted to be requested by future read requests.

6. A method of caching data for use by a storage appliance connected with one or more storage devices, the method comprising:

providing the storage appliance configured for:

providing a file system for organizing data in a plurality of files, each file having at least one established read stream comprising a sequence of data accesses to the file;

receiving a read request for requested data of a file;

beginning predictive processing for selecting readahead data from the one or more storage devices, the readahead data not comprising the requested data and comprising predicted data for pre-loading into a buffer cache;

maintaining a counter that indicates a number of consecutive read requests satisfied by the storage appliance by retrieving data from the buffer cache without retrieving data from the one or more storage devices;

determining the value of the counter; and responsive to determining that the value of the counter exceeds a threshold value, terminating the predictive processing, wherein the threshold value is based on a maximum number of concurrent read streams processed by the file system at the same time, a maximum readahead blocksize comprising a maximum number of readahead data blocks loaded to the buffer cache per read stream for one predictive processing execution, and an amount of overlap indicating a number of same readahead data blocks in the buffer cache.

7. The method of claim 6, further comprising:

extracting data from the buffer cache for responding to the read request for requested data;

determining whether there is a fully-cached read comprising retrieving all requested data from the buffer cache without requiring retrieval of data from a storage device;

if there is a fully-cached read, incrementing the counter; and if there is no fully-cached read, then:
  causing a retrieval of the requested data from the storage devices of the storage appliance, and
  resetting the value of the counter to resume the predictive processing.

8. The method of claim 6, further comprising:

responsive to determining that the value of the counter exceeds the predetermined threshold value, further foregoing a readahead execution phase for loading the readahead data into the buffer cache.

9. The method of claim 6, wherein the counter indicates a number of consecutive read requests for a volume of the file system satisfied by the storage appliance by retrieving data from a buffer cache without retrieving data from the one or more storage devices.

10. The method of claim 6, wherein predictive processing comprises selecting readahead data comprising data blocks predicted to be requested by future read requests.

11. A computer readable medium for storing a program having sets of instructions for caching data for use by a storage appliance comprising one or more storage devices, the computer readable medium having instructions for:

providing a file system for organizing data in a plurality of files, each file having at least one established read stream comprising a sequence of data accesses to the file;

receiving a read request for requested data of a file;

maintaining a counter that indicates a number of consecutive read requests satisfied by the storage appliance by retrieving data from a buffer cache without retrieving data from the one or more storage devices;

determining the value of the counter;

responsive to determining that the value of the counter does not exceed a threshold value, performing predictive processing for selecting readahead data from the one or more storage devices, the readahead data not comprising the requested data and comprising predicted data for loading into the buffer cache; and responsive to determining that the value of the counter exceeds the threshold value, foregoing the predictive processing, wherein the threshold value is based on a maximum number of concurrent read streams processed by the file system at the same time, a maximum readahead blocksize comprising a maximum number of readahead data blocks loaded to the buffer cache per read stream for one predictive processing execution, and an amount of overlap indicating a number of same readahead data blocks in the buffer cache.

12. The computer readable medium of claim 11, further comprising instructions for:

responsive to determining that the value of the counter exceeds the predetermined threshold value, further foregoing a readahead execution phase for loading the readahead data into the buffer cache.

13. The computer readable medium of claim 11, further comprising instructions for:

building a response to the read request by extracting data from the buffer cache; and for requested data not found in the buffer cache, loading the requested data into the buffer cache.

14. The computer readable medium of claim 11, wherein the counter indicates a number of consecutive read requests for a volume of the file system satisfied by the storage appliance by retrieving data from a buffer cache without retrieving data from the one or more storage devices.

15. The computer readable medium of claim 11, wherein predictive processing comprises selecting readahead data comprising data blocks predicted to be requested by future read requests.

16. A storage appliance configured for caching data, the storage appliance comprising:

one or more storage devices coupled to the storage appliance;

a buffer cache for the temporary storage of data;

a file system configured for:
  organizing data in a plurality of files, each file having at least one established read stream comprising a sequence of data accesses to the file; and
  receiving a read request for requested data of a file; and a readahead module configured for:
  maintaining a counter that indicates a number of consecutive read requests satisfied by the storage appliance by retrieving data from the buffer cache without retrieving data from the one or more storage devices;
  determining the value of the counter;
  responsive to determining that the value of the counter does not exceed a threshold value, performing predictive processing for selecting readahead data from the one or more storage devices, the readahead data not comprising the requested data and comprising predicted data for loading into the buffer cache; and
  responsive to determining that the value of the counter exceeds the threshold value, foregoing the predictive processing, wherein the threshold value is based on a maximum number of concurrent read streams processed by the file system at the same time, a maximum readahead blocksize comprising a maximum number of readahead data blocks loaded to the buffer cache per read stream for one predictive processing execution, and an amount of overlap indicating a number of same readahead data blocks in the buffer cache.

17. The storage appliance of claim 16, wherein the module is further configured for:

responsive to determining that the value of the counter exceeds the predetermined threshold value, further foregoing a readahead execution phase for loading the readahead data into the buffer cache.

18. The storage appliance of claim 16, wherein the module is configured to build a response to the read request by using the buffer cache by:

extracting data from the buffer cache; and for requested data not found in the buffer cache, loading the requested data into the buffer cache.

19. The storage appliance of claim 16, wherein the counter indicates a number of consecutive read requests for a volume of the file system satisfied by the storage appliance by retrieving data from a buffer cache without retrieving data from the one or more storage devices.

20. The storage appliance of claim 16, wherein predictive processing comprises selecting readahead data comprising data blocks predicted to be requested by future read requests.

* * * * *